United States Patent [19]
Brune

[11] 3,807,773
[45] Apr. 30, 1974

[54] CONDUIT UNION AND GASKET
[76] Inventor: Heinz Brune, 1262 No. 2 Sideroad, Burlington, R.R. No. 3, Campbellville, Ontario, Canada
[22] Filed: Dec. 2, 1971
[21] Appl. No.: 204,199

[52] U.S. Cl. ................... 285/52, 277/110, 277/225, 285/30, 285/354
[51] Int. Cl. ............................................. F16l 19/00
[58] Field of Search ................. 285/30, 52, 51, 354; 277/110, 225

[56] References Cited
UNITED STATES PATENTS

| | | | |
|---|---|---|---|
| 1,949,829 | 3/1934 | Ellis | 285/30 |
| 3,115,354 | 12/1963 | Bowan et al. | 285/52 |
| 2,867,463 | 1/1959 | Snider | 285/52 X |
| 2,862,732 | 12/1958 | Guillou | 285/354 X |
| 2,850,299 | 9/1958 | Risley | 285/354 X |
| 2,757,943 | 8/1956 | Henderson | 285/354 X |
| 2,174,105 | 9/1939 | Haury | 285/354 X |

*Primary Examiner*—Thomas F. Callaghan

[57] ABSTRACT

A gasket disposable in sandwiched relation between the mating male and female elements of a conduit union and comprising an annulus formed of a rigid substance which is deformably compressible between said male and female elements when they are tightened together, said annulus defining an aperture snugly accommodating the end of a conduit. A cam surface is provided on said annulus and a formation on one of said union elements conforming to and cooperating with said cam surface to constrict it into gripping and sealing relation with said conduit end and into sealing relation with the other conduit element when said union elements are tightened together.

2 Claims, 5 Drawing Figures

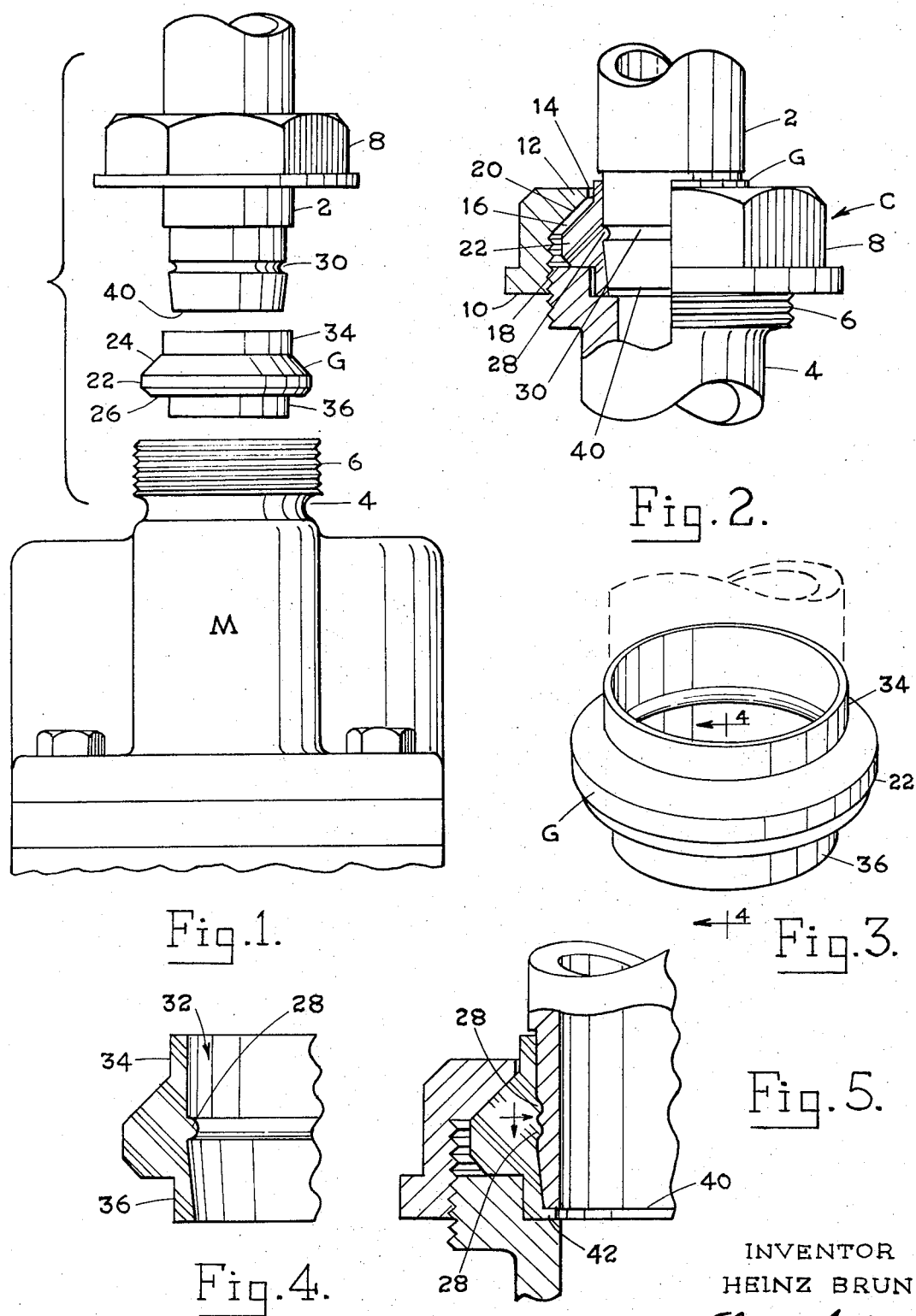

CONDUIT UNION AND GASKET

This invention relates to conduit unions and, in particular, to improvements in gaskets employed within conduit unions not only for hermetic sealing but also to electrically insulate two union interconnected conduits from each other.

The union herein visualized is somewhat similar to the conventional type of conduit coupling which consists of male and female elements adjustably interengageable with each other to define an enclosure with mutually confronting walls which are movable towards and away from each other according to the adjustment of the elements. In said conventional coupling the female element has an interiorly threaded collar which is topped by an inwardly projecting lip defining a narrowed aperture through which a conduit is able to enter the female element to engage an apertured flange conventionally contained therein; said flange being non-withdrawable through said aperture. The male element consists of another apertured flange which is mountable on a conduit and is exteriorly threaded to mate with the female element. Finally, a compressible gasket is installed between the two flanges for obvious purposes and is compressed between them when the female element is tightened on the male element; the lip on the female element and the male element constituting the walls forming the enclosure above noted.

Gaskets in unions are mainly used for the purpose of procuring a hermetic seal in the coupling to prevent escape of fluid travelling from one conduit to the next. However, the invention is principally concerned with a gasket which not only serves this purpose but also serves to electrically insulate one conduit from the other for use in situations such as when a gas meter is connected to a gas main; it being a cardinal object of the invention to provide a gasket as aforesaid which is reliable and effective in operation, simple to apply and economical to manufacture.

The invention also visualizes simplification of the union aforesaid — apart from the gasket — by rendering at least one of the conventional flanges aforesaid superfluous which is another and more specific object of the invention.

In greater detail the invention seeks, as a further object, to supply a gasket as aforesaid which is capable of being driven onto the raw end of a conduit where it serves not only in the place and stead of the flange normally applied to said conduit but, in addition, serves also as a seal to prevent fluid loss as well as an electrical insulator for the stated purposes.

As yet a further object, the invention visualizes parts fashioned so that when the gasket is pressed against the co-acting flange, it will simultaneously be tightened around the conduit on which it is mounted not only to form the fluid tight seal aforesaid but also to exert a major grip on the conduit to resist separation. For this purpose, said gasket, while inherently rigid, is necessarily deformable to a limited degree responsive to the tightening aforesaid to conform to the co-acting flange to form a fluid-tight seal therewith.

The various objects of this invention are achieved essentially by providing a gasket disposable in sandwiched relation between the mating male and female elements of a conduit union and comprises an annulus formed of a rigid substance which is deformably compressible between said two union elements when they are tightened together. Said annulus has a cam surface and an aperture snugly accommodating the raw end of a conduit. The conduit union includes a formation on one of said union elements conforming to and cooperating with said cam surface to constrict it into gripping and sealing relation with said conduit end and into sealing relation with the other conduit element when said union elements are tightened together.

The foregoing objects and others, more or less broad than the foregoing, will become apparent from the hereinafter following description of the constituent parts, elements and principles of the invention given herein solely by way of example with reference to the embodiment herein described and illustrated in the accompanying drawing wherein like reference devices denote like parts of the invention throughout the several views and wherein:

FIG. 1 — is a view of a conduit union assembly and gas meter with the various parts disassembled;

FIG. 2 — is a view of a conduit union assembly loosely assembled with sections broken away showing the co-operating parts;

FIG. 3 — is a perspective view of the gasket according to the present invention;

FIG. 4 — is a cross-sectional view of the gasket taken along line 4—4 of FIG. 3, and FIG. 5 — is a partial cross-sectional view of a tightly assembled conduit union assembly with a slightly modified form of gasket.

In FIGS. 1 and 2 are shown a conduit union C as herein visualized with gasket G incorporated therein according to the present invention which interconnects conduit end 2 to inlet pipe 4 of gas meter M, for example; said gasket G being formed of a rigid, deformable and dielectric material providing electrical insulation between said conduit end 2 and inlet pipe 4. Conduit union C includes an externally threaded male element 6 having an aperture communicating with inlet pipe 4 and further includes female element 8 having an interiorly threaded collar 10 topped by an inwardly projecting lip 12 defining a narrowed aperture 14; said female element 8 being adjustably interengageable with male element 6 to define an enclosure 16 shown in FIG. 2 with mutually confronting and opposing walls 18 and 20 on said male and female elements, respectively. Said walls 18 and 20 being movable towards and away from each other in accordance with the adjustment between female element 8 and male element 6.

As shown in FIG. 2 gasket G is snugly mountable on a substantially raw conduit end 2 which projects into enclosure 16 through aperture 14 of female element 8. Said gasket G includes a radially and axially thickened annulus 22 sandwiched between and capable of being in substantially full engagement with confronting walls 18 and 20 and deformably compressible by said walls as they are adjusted towards each other.

More particularly, annulus 22 includes opposed exterior surfaces 24 and 26, respectively. One said surface, preferably that which is engaged by wall 20, is cammed as at 24 so that when annulus 22 is subjected to axial compression there will be component compressive forces as shown by the arrows in FIG. 5 developed inwardly and transversely to the axial orientation of annulus 22 deforming it inwardly towards its centre. Conforming to cam surface 24 is wall 20 which co-operates therewith over substantially its entire area when said female element 8 is interengaged with said male element 6 to press annulus 22 into gripping and sealing relation with conduit end 2 to retain said conduit end 2 within enclosure 16, and to prevent fluid escape therebetween. The second surface 26 and wall 18 which conforms thereto also co-operate to provide a seal therebetween when said annulus 22 is pressed against said wall 18 as aforesaid.

The invention also visualizes means for locating or positioning the gasket G on conduit end 2; said means being constituted in this embodiment by a rib 28 on one of them matingly receivable in a groove 30 on the other. Preferably rib 28 is disposed on the interior wall of annulus 22 and opposite said cam surface 24 so as to project into aperture 32 as shown in FIG. 4; the groove 30 being formed between smooth surfaces on the annular conduit end 2 which may also be tapered slightly from groove 30 to the extremity 40 of said conduit end 2 to facilitate mounting of gasket G thereon. As annulus 22 is compressed between confronting walls 18 and 20 aforesaid, rib 28 will mushroom out within groove 30 tightly gripping and sealing said annulus 22 to said conduit end 2. That is to say, by virtue of the fact that said cam surface 24 is disposed opposite said positioning means or rib 28, said annulus 22, when compressed axially, will be constricted by component compressive forces in the region of its said rib 28 enabling rib 28 to mushroom out within groove 30 into rigid gripping and sealing relation with the raw conduit end 2. If desired, a plurality of ribs 28 may be employed in aperture 32 as shown in FIG. 5 for example, for mating engagement with a like number of grooves on a conduit end.

To provide complete insulation between the conduits, gasket G includes in addition to annulus 22, integral extensions 34 and 36, respectively, as shown in FIGS. 3 and 4 for surrounding said conduit end 2 above and below annulus 22 and so providing insulation between it and the elements of the conduit union C as shown in FIGS. 2 and 5. Extension 34 is of a length to extend upwardly to a substantial degree through aperture 14 of female element 8 when it is interengaged with male element 6 as aforesaid. Extension 36 is of a length to extend beyond extremity 40 of conduit end 2 insulating said extremity 40 against contact with the inlet pipe 4.

Desirably said extension 36 may extend to and overlap the conduit wall at the extremity 40 of said conduit end 2; the overlap portion constituting an inwardly extending flange 42 as shown in FIG. 5 having a width corresponding substantially to the wall thickness of conduit end 2 at its extremity.

It may now be appreciated in viewing FIGS. 2 and 5 that gasket G provides conduit end 2 to be completely electrically insulated and out of contact with the other elements of conduit union C. Moreover, gasket G provides conduit end 2 to be firmly locked within union C while at the same time effecting a fluid-tight seal between the two conduits.

I claim:

1. A conduit union including male and female elements interengageable with each other to define an enclosure with mutually confronting and opposing walls, a conduit having an end projecting into said enclosure through one of said elements, one said confronting wall being planar in a direction generally perpendicular to the conduit axis, and the other said wall being disposed obliquely of said planar wall and diverging therefrom towards said conduit axis, said elements being adjustable to move towards and away from each other respectively decreasing and increasing the distance between the mutually confronting and opposing walls, the exterior wall of the conduit end projecting into the enclosure being smooth generally throughout its length and having an annular groove disposed intermediately thereof, the conduit end tapering slightly from said groove to its extremity, and a dielectric gasket mounted on said conduit end in the enclosure between said elements, said gasket comprising:

a radially and axially thickened annulus conforming to a portion of said conduit end and including an annular rib on its interior wall mateable with the annular groove on said conduit end for positioning said annulus relative to the extremity of said conduit end, and being formed of a substance which is essentially rigid yet deformable to a limited degree under great pressure between the opposing walls of the elements when they are moved towards each other;

a planar surface on the exterior of said annulus conforming to and cooperating with said planar wall to form a seal therewith when said annulus is deformed as aforesaid;

an opposed cam surface diverging from said planar surface towards the interior of said annulus, said cam surface being opposite said rib and conforming to and cooperating with said oblique enclosure wall over substantially its entire area to constrict said annulus in the region of its said rib compelling the latter to mushroom within said groove into rigid gripping and sealing relation with the conduit end when said elements are moved towards each other to deform the annulus as aforesaid;

a relatively thin, annular extension integral with said annulus adjacent its cam surface, said extension extending through said aperture and conforming to the corresponding smooth conduit surface;

a relatively thin, annular, second extension integral with said annulus adjacent its planar surface, said second extension extending to the extremity of said conduit end and conforming to its smooth tapering surface aforesaid, and an inwardly extending flange integral with said second extension and having a width corresponding generally to the wall thickness of said conduit end at its extremity which it overlaps.

2. A conduit union as defined in claim 1 wherein: one of said elements forms a part of a gas meter and the conduit end aforesaid extends from a gas main.

* * * * *